United States Patent
Cadra et al.

(10) Patent No.: US 12,043,682 B2
(45) Date of Patent: Jul. 23, 2024

(54) SOLUTIONS BASED ON A THIXOTROPIC FILLER AND NEW POLYMER MATERIALS OBTAINED FROM THESE SOLUTIONS THAT CAN BE USED FOR TRAPPING TOXIC CHEMICAL AGENTS

(71) Applicant: COMMISSARIAT À L'ÉNERGIE ATOMIQUE ET AUX ÉNERGIES ALTERNATIVES, Paris (FR)

(72) Inventors: Stéphane Cadra, Saint Avertin (FR); Benoit Blondel, Chambray-les-Tours (FR); Axel Jaeghers, Saint-Cyr-sur-Loire (FR); Axelle Champion, Joue-les-Tours (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 969 days.

(21) Appl. No.: 16/982,700

(22) PCT Filed: Mar. 26, 2019

(86) PCT No.: PCT/FR2019/050687
§ 371 (c)(1),
(2) Date: Sep. 21, 2020

(87) PCT Pub. No.: WO2019/186055
PCT Pub. Date: Oct. 3, 2019

(65) Prior Publication Data
US 2021/0009737 A1     Jan. 14, 2021

(30) Foreign Application Priority Data
Mar. 27, 2018  (FR) ...................... 1852654

(51) Int. Cl.
| | | |
|---|---|---|
| C08F 220/54 | (2006.01) | |
| C08F 2/10 | (2006.01) | |
| C08F 2/44 | (2006.01) | |
| C08K 3/36 | (2006.01) | |
| C08K 5/05 | (2006.01) | |
| C08L 33/24 | (2006.01) | |

(52) U.S. Cl.
CPC .............. *C08F 220/54* (2013.01); *C08F 2/10* (2013.01); *C08F 2/44* (2013.01); *C08K 3/36* (2013.01); *C08K 5/05* (2013.01); *C08L 33/24* (2013.01)

(58) Field of Classification Search
CPC ............ C08F 220/64; C08F 2/10; C08F 2/44; C08K 3/36; C08K 5/05; C08L 33/24
USPC ...................................... 526/307.2
See application file for complete search history.

(56) References Cited

U.S. PATENT DOCUMENTS

2016/0002457 A1* 1/2016 Hamad ................. C08F 2/44
                                                           523/333
2019/0031979 A1* 1/2019 Cadra .................. C08K 3/16

FOREIGN PATENT DOCUMENTS

WO    2014/127470 A1    8/2014
WO    2017/129688 A1    8/2017

OTHER PUBLICATIONS

International Search Report of PCT/FR2019/050687 dated Jun. 14, 2019.
Written Opinion of PCT/FR2019/050687 dated Mar. 26, 2019.
Gkikas, Manos et al.: "Hydrogels That Actuate Selectively in Response to Organophosphates", Advanced Functional Materials vol. 27, No. 6, Sep. 6, 2016.
Yair, Simo et al.: Organosphosphate degrading microorganisms and Enzyles as Biocatalysts in Environmental and Personal Decontamination Applications » CRC Critical reviewq in Biorechnology, Dec. 16, 2008, vol. 28, No. 4.
Romain, Castellani et al: "Efficiency enhancement of decontamination gels by a superabsorbent polymer" Colloids and surfaces a : Physiochemical and engineering aspects, Jan. 20, 2014, vol. 454, pp. 89-95.
Gershonov, E. et al. "Facile Hydrolysis-Based Chemical Destruction of hte Warfare Agents VX, GB, and HD by Alumina-Supported Fluoride Reagents" In: Journal of Organic Chemistry 2009, 74, 329-338.
Larsson, Lennart "The Alkaline Hydrolysis of isoPropoxy-methyl-phosphoryl Flouride and some Analogues" In: Acta Chemica Scandinavica 1957, vol. 11, pp. 1131-1142.
Yang, Yu-Chu et a'. "Autocatalytic Hydrolysis of V-Type Nerve Agents" In: Journal of Organic Chemistry 1996, vol. 61, No. 24, pp. 8407-8413.
Bomberg, Iev et al. "Degradation of Chemical Warfare Agents by Reactive Polymeres" In: Ind. Eng. Chem. Res. 2009, vol. 48, No. 3, pp. 1650-1659.
Preliminary French Search Report for French application No. FR1852654 dated Dec. 11, 2018.
U.S. Appl. No. 17/040,626 entitled "Use of Specific and Polymer Materials Obtained From These Solutions for Trapping Toxic Chemical Agents" filed Sep. 23, 2020 (26 total pages).

* cited by examiner

*Primary Examiner* — Michael M. Bernshteyn
(74) *Attorney, Agent, or Firm* — Pearne & Gordon LLP

(57) ABSTRACT

A solution that can be used for trapping at least one toxic chemical agent, the solution comprising at least one protic solvent, at least one monomer comprising an (alkyl)acrylic, (alkyl)acrylate or (alkyl)acrylamide group, at least one crosslinking agent comprising at least two groups chosen from the (alkyl)acrylic, (alkyl)acrylate or (alkyl)acrylamide groups, at least one photopolymerization initiator, at least one thixotropic filler and at least one agent chosen from alkali metal halides, alkali metal phosphates, alkali metal sulfates and mixtures thereof.

20 Claims, No Drawings

SOLUTIONS BASED ON A THIXOTROPIC FILLER AND NEW POLYMER MATERIALS OBTAINED FROM THESE SOLUTIONS THAT CAN BE USED FOR TRAPPING TOXIC CHEMICAL AGENTS

CROSS-REFERENCE TO RELATED APPLICATIONS

This is a National Stage application of PCT international application PCT/FR2019/050687, filed on Mar. 26, 2019, which claims the priority of French Patent Application No. 1852654, filed Mar. 27, 2018, both of which are incorporated herein by reference in their entirety.

TECHNICAL AREA

The present invention relates to solutions which may be used for trapping chemical toxic agents, such as chemical organophosphorus compounds, as well as to polymeric materials obtained from these solutions which may also be used for trapping these agents.

As a result of their trapping properties with respect to toxic agents, such as organophosphorus compounds, these solutions or polymeric materials may find application in the decontamination of media comprising organophosphorus chemical compounds, for example, in certain environments, such as the chemical industry, agriculture or even in sectors of fighting chemical warfare gas attacks.

In general, the organophosphorus compounds present in these environments are in the form of organic compounds exhibiting proven toxicity for the human organism, the average lethal concentration per inhalation being at least 10 $mg.min.m^{-3}$, as described in *J. Org. Chem.* 1996, 61, 8407-8413. In fact, these compounds may be involved in the inhibition mechanism of acetylcholinesterase preventing muscle relaxation and may thus cause death by asphyxiation.

These compounds may be included in the formulation of insecticides, pesticides or even chemical warfare agents and are conventionally in the form of water-soluble oily organic compounds which, once dispersed in the environment, have a half-life in water which may range from 5 hours to 80 hours, with, however, the risk that the products of degradation by hydrolysis in the water may remain toxic for a period of 30 to 60 days.

In view of their toxicity, a great deal of research has been undertaken to develop curative solutions to the threats linked to organophosphate compounds, one of the axes of this research being aimed at finding systems to catalyze the process of degradation of these compounds, in order to render them rapidly inactive.

These decontaminating systems are generally in the form of liquids or powders in the form of sprays or else in the form of a liquid imbibing a sponge, the active ingredients at the origin of the decontamination may be of inorganic or organic origin.

As examples of inorganic active ingredients, mention may be made of alkaline solutions, such as sodium hydroxide solutions (NaOH), potassium hydroxide solutions (KOH), ammonium hydroxide solutions ($NH_4OH$), which were the first decontaminating solutions to be studied at the end of the 1950s, due to their effectiveness against warfare organophosphorus compounds, such as Sarin gas or Soman gas, which fall into the category of type G neurotoxicants, such systems being described in *Act. Chem. Scand.* 1957, 11, 1131-1142.

From the point of view of the mechanism of action of these alkaline solutions with respect to organophosphorus compounds, it has been shown that they make it possible to increase the kinetics of hydrolysis of Sarin and Soman gases by increasing the pH value of the medium, the half-life being reduced to 8 minutes in basic medium. On the other hand, the use of alkaline solutions is ineffective against more persistent organophosphorus compounds, such as type V nerve agents (and more specifically VX and VR-55 agents).

For these type V neurotoxic agents, new solutions have been proposed, as described in *J. Org. Chem.* 2009, 74, 329-338, where, in order to improve the hydrolysis of these agents, it is proposed to adsorb them on a pulverulent mixture composed of potassium fluoride (KF) and alumina ($Al_2O_3$), this mixture allowing, in the presence of water, the generation of potash (KOH), which induces an increase in the pH of the medium.

As examples of organic active ingredients, it has been proposed to use α-nucleophilic organic compounds, i.e. a compound comprising a nucleophilic group adjacent to an atom carrying an electronic doublet, which doublet has the effect of strengthening the nucleophilic character of the compound. Compounds meeting this definition and effective for the decontamination of a medium comprising organophosphorus compounds such as agents of type G or V, are oximate compounds, such as 2,3-butanedione monoxime.

As an alternative, it has also been proposed to integrate these oximate functions directly into a polymer, for example, starting from a base polymer of the polyacrylonitrile type. The amidoximate groups thus generated have a high nucleophilicity with a pKa of the order of 11 to 12 (compared to 8, for conventional oximes), as described in *Ind. Eng. Chem. Res.* 2009, 48, 1650-1659, the resulting polymers exhibiting high dispersion efficiency in water with respective half-lives of 5 minutes and less than 3 minutes for VX gas and Sarin gas.

Also, in view of what exists, the inventors set out to develop new systems which may be used for the decontamination of toxic chemical agents and, more particularly, of organophosphorus compounds and which, in addition to their efficiency, are easy to use and suitable for all types of substrates on which toxic chemical agents may be found.

STATEMENT OF THE INVENTION

Thus, the invention relates to solutions which may be used for trapping at least one toxic chemical agent, such as an organophosphorus compound, said solutions comprising at least one protic solvent, at least one monomer comprising an (alkyl)acrylic group, an (alkyl)acrylate group or an (alkyl) acrylamide group, at least one crosslinking agent comprising at least two groups chosen from (alkyl)acrylic, (alkyl)acrylate or (alkyl)acrylamide groups, at least one photopolymerization initiator, at least one thixotropic filler, and at least one agent selected from among alkali metal halides, alkali phosphates, alkali sulphates and mixtures thereof.

By solution, is meant a homogeneous liquid mixture of the above-mentioned ingredients, which means that these are all used so as to be soluble in the protic solvent of the solution.

The term protic solvent is understood to mean a polar solvent having at least one hydrogen atom capable of intervening in the formation of hydrogen bonds, an example of a protic solvent which is particularly advantageous for the invention being water, in which case the solutions of the invention may be qualified as aqueous solutions. Protic solvent, such as water, may be present in the solution at 40 to 60% by volume of the total volume of the solution.

By (alkyl)acrylic group, (alkyl)acrylate group or (alkyl) acrylamide group, we mean respectively:

for the (alkyl)acrylic group, an acrylic group or an alkylacrylic group (which means that an alkyl group is present on the carbon carrying the double bond and the —CO— group);

for the (alkyl)acrylate group, an acrylate group or an alkylacrylate group (which means that an alkyl group is present on the carbon carrying the double bond and the —CO— group); and for the (alkyl)acrylamide group, an acrylamide group or an alkylacrylamide group (which means that an alkyl group is present on the carbon carrying the double bond and the —CO— group).

An example of an (alkyl)acrylic group, (alkyl)acrylate group or (alkyl)acrylamide group is respectively a (meth)acrylic group, a (meth)acrylate group or a (meth)acrylamide group.

By thixotropic filler is meant a filler capable of giving the solution, in which it is included, thixotropic properties, which means that the solution has a high apparent viscosity, which decreases over time, when it is subjected to mechanical stress, such as agitation or shearing. In other words, the presence of at least one thixotropic filler in the solution makes it possible to generate low energy cohesive bonds within this solution so as to give it gelling properties, such as high viscosity and, as a result, a limited flow, wherein these bonds, degradable during mechanical stress, regenerate spontaneously once the solution is at rest. We may also use the expression "shear thinning filler" instead of "thixotropic filler".

As mentioned above, the solutions of the invention comprise at least one monomer comprising an (alkyl)acrylic group, an (alkyl)acrylate group or an (alkyl)acrylamide group, such monomers possibly corresponding to the following formula (I):

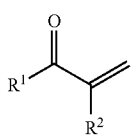

(I)

in which:

$R^1$ represents —OR' with R' representing a hydrogen atom or an alkali element (such as sodium or potassium);

—$OR^3$ with $R^3$ representing an alkyl group, preferably comprising from 1 to 4 carbon atoms (such as a methyl group, an ethyl group); or —$NR^4R^5$ with $R^4$ and $R^5$ representing, independently of one another, a hydrogen atom or an alkyl group, preferably comprising from 1 to 4 carbon atoms (such as a methyl group, an ethyl group);

$R^2$ represents a hydrogen atom or an alkyl group, preferably comprising 1 to 4 carbon atoms (such as a methyl group, an ethyl group).

Advantageously, the monomer(s) of the invention comprise an (alkyl)acrylamide group, such as those corresponding to the following formula (II):

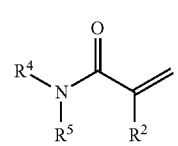

(II)

in which:

$R^4$ and $R^5$ are as defined above;

$R^2$ is as defined above.

In particular, it may be a monomer of formula (II), in which $R^2$ is a hydrogen atom and $R^4$ and $R^5$ represent a methyl group, such a monomer corresponding to N,N'-dimethylacrylamide.

The monomer(s) may be present in the solution in an amount of 40 to 60% by volume relative to the total volume of the solution. By way of example, when the monomer is N,N'-dimethylacrylamide, it may be present in an amount of 47.8% by volume relative to the total volume of the solution.

The solutions of the invention also comprise at least one crosslinking agent comprising at least two groups chosen from (alkyl)acrylic, (alkyl)acrylate, (alkyl)acrylamide groups, which means, in other words, that it is a compound comprising, for example:

at least two (alkyl)acrylic groups;

at least two (alkyl)acrylate groups;

at least two (alkyl)acrylamide groups;

at least one (alkyl)acrylic group and at least one (alkyl)acrylate group;

at least one (alkyl)acrylic group and at least one (alkyl)acrylamide group; or at least one (alkyl)acrylate group and at least one (alkyl)acrylamide group.

Advantageously, the crosslinking agent(s) are agents comprising at least two (alkyl)acrylate groups, such as those corresponding to the following formula (III):

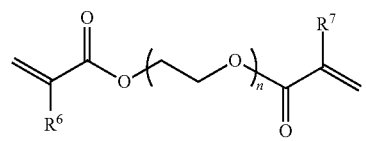

(III)

in which:

$R^6$ and $R^7$ represent, independently of each other, a hydrogen atom or an alkyl group, for example, comprising 1 to 4 carbon atoms (for example, a methyl group, an ethyl group);

n corresponds to the unit count in parenthesis, this number ranging from 1 to 15.

By way of example, a crosslinking agent which may be used in the solutions of the invention is an agent of formula (III), in which $R^6$ and $R^7$ are methyl groups, this agent thus corresponding to a polyethylene glycol dimethacrylate.

It is entirely possible to imagine using several distinct crosslinking agents falling within the scope of the definition of the agents of formula (III) defined above.

It is also to be understood that crosslinking agents are distinct from the monomers used in the solutions of the invention.

In particular, it is possible to use a mixture of polyethylene glycol dimethacrylate with an average molar mass of 750 g/mol, which corresponds to a mixture of several molecules of formula (III) defined above, with an average count of ethylene glycol units of 13.2. The crosslinking agent(s) may be present in the solution in an amount of 1 to 5% by volume relative to the total volume of the solution.

When it comes to the mixture of polyethylene glycol dimethacrylate mentioned above, this mixture may be present in the solution in an amount of 1.6% by volume based on the total volume of the solution.

The solutions also comprise at least one photopolymerization initiator (which may also be referred to as photoinitiator), which initiator is a compound capable of generating free radicals when subjected to appropriate radiation (for example, UV radiation of between 350 and 420 nm). The radicals thus formed will thus react with the reactive sites of the compounds present in the solution (here, the polymerizable functions of the monomers and of the crosslinking agents) thus resulting in the polymerization of these compounds. The initiator(s) is/are advantageously solubilized by at least one of the constituent ingredients of the solution (for example, the protic solvent).

The photopolymerization initiator(s) capable of being used in the solutions of the invention may be initiators of the aromatic ketone family, such as 1-hydroxy-cyclohexylphenyl ketone (also known under the trade names IRGA-CURE® 184 or CPK®) or (phenylphosphoryl)bis(mesitylmethanone) (known under the name IRGACURE® 819) or a mixture of these two photoinitiators.

The photopolymerization initiator(s) may be present in the solution in an amount of 1 to 15 g/L. For example, when the initiator is IRGACURE® 184, it may be present at 11.5 g/L.

Furthermore, the solutions of the invention also include a thixotropic filler, which may be an organic filler, an inorganic filler or a mixture thereof.

As examples of organic thixotropic fillers, we may mention a polyvinyl alcohol or copolymers based on acrylate and/or methacrylate, units.

As examples of inorganic thixotropic fillers, mention may be made of colloidal silica, fumed silica and mixtures thereof and, more specifically, a fumed silica having a specific surface area ranging from 100 to 500 $m^2$/g and, for example, an average particle diameter less than 1 μm.

Advantageously, the thixotropic filler may consist of a single inorganic filler and, more specifically, of fumed silica, or may be constituted by a mixture of an inorganic filler and of an organic filler, for example, a mixture of fumed silica and polyvinyl alcohol.

The thixotropic filler(s) may be present in the solution in an amount of 1 to 10% by mass of the total mass of the solution.

Finally, the solutions of the invention comprise at least one agent chosen from among alkali halides, alkali phosphates, alkali sulphates and mixtures thereof.

The inventors have noted that these agents contribute to neutralizing organophosphorus compounds and, in particular, type V warfare organophosphorus compounds, which are compounds comprising a sulfur atom, which is connected to a phosphonate group, the above-mentioned agents being able to cut the phosphorus-sulfur bonds to accelerate hydrolysis.

In addition, the above-mentioned agents make it possible to increase the ionic strength of the solutions containing them, which makes it possible, among other things, to increase the trapping power of organophosphorus compounds by osmotic pressure.

The agent(s) may be present in the solution in an amount of 1 to 15 g/L or 1 to 5% by mass relative to the total mass of the solution.

More specifically, the agent(s) may be chosen from among alkaline fluorides.

A particularly effective agent which may be used in the solutions of the invention is potassium fluoride, which may be, for example, present in the solution in an amount of 11.5 g/L.

By way of example, the solutions of the invention may be composed exclusively of at least one protic solvent, of at least one monomer comprising an (alkyl)acrylic group, an (alkyl)acrylate group or an (alkyl)acrylamide group, of at least one crosslinking agent comprising at least two groups chosen from among (alkyl)acrylic, (alkyl)acrylate or (alkyl)acrylamide groups, at least one photopolymerization initiator, at least one thixotropic filler, and at least one agent selected from alkali halides, alkali phosphates, alkali sulphates and mixtures thereof.

A solution according to the invention is a solution comprising or consisting exclusively of the following ingredients:

as a protic solvent, water;
as a monomer, N,N'-dimethylacrylamide;
as a crosslinking agent, a polyethylene glycol dimethacrylate or a mixture thereof;
as a photopolymerization initiator, 1-hydroxy-cyclohexylphenyl ketone (also known under the trade name IRGACURE® 184);
as thixotropic filler, fumed silica or a mixture of fumed silica and polyvinyl alcohol; and
as an agent, potassium fluoride.

The solutions of the invention constitute liquid formulations applicable to a wide range of objects contaminated with organophosphorus compounds due to the good compatibility of these solutions with respect to a wide range of surfaces (such as a metallic surface like an aluminum surface, a surface covered with a layer of paint, an enamel surface or a surface of plastic material).

It is specified that, by good compatibility, is meant that no degradation (such as a phenomenon of corrosion, coloring, swelling, flaking or alteration perceptible to the naked eye) is visible after 1 hour following contact with the solutions of the invention.

Once applied to such a surface, for example, by coating, injection or spraying, the solutions of the invention, thanks to the presence of the thixotropic filler(s), remain stable on the surface to be treated without the phenomenon of runoff, even if the surface to be treated is an inclined surface. In addition, the solutions, by virtue of their intrinsic properties linked to the nature of the above-mentioned ingredients, are able to integrate, by natural diffusion and natural miscibility, chemical toxic agents, such as organophosphorus compounds initially present on the surface. Solutions that have trapped these toxic agents may then be gelled under the influence of natural or artificial radiation (which involves the application of radiation other than radiation from natural light). More specifically, under the effect of the appropriate radiation, the photopolymerization initiator(s) are activated and initiate the polymerization of the monomer(s) and of the crosslinking agent(s) in the solution. It should also be noted that, as a result of an unanticipated synergistic effect between the thixotropic filler(s) and the polymerization initiator(s), the gel setting times were drastically reduced compared to solutions devoid of a thixotropic filler. At the end of the polymerization, this thus results in a solidification of the solution in the form of a polymer material, which is in the form of a cohesive gel (which may be classified as a hydrogel when the protic solvent is water), in which the toxic agents are physically trapped in the remaining solution, which is itself completely trapped in the polymer network of the gel. This cohesive gel constitutes a containment membrane, which is integral and may be handled, and which may then be removed mechanically, for example, by simply peeling off the surface of the substrate, thus leaving a decontaminated substrate. As a result, the toxic agents thus trapped are removed from the contaminated surface without requiring the use of special rinsing, recovery or effluent treatment devices. The polymeric material constitutes a material for confining the toxic chemical agents initially present on the surface to be decontaminated.

It should also be noted that, due to the reactivity of the solution with respect to organophosphorus compounds, more particularly warfare toxins or any other organophosphorus compound having a phosphorus-halogen bond, a phosphorus-sulfur bond or a hydrolyzable bond, the organophosphorus compounds trapped in the gel may be naturally degraded in situ.

The invention thus also relates to a polymeric material capable of being obtained by polymerization of a solution in accordance with the invention, said material comprising a polymer resulting from the polymerization of the monomer(s) and of the crosslinking agent(s) defined above (in other words, the polymer comprises repeating units resulting from the polymerization of the monomer(s) and of the crosslinking agent(s)) trapping within it, a liquid phase (for example, a phase comprising a protic solvent, such as water) comprising at least one thixotropic filler and at least one agent chosen from among alkali metal halides, alkaline phosphates, alkali metal sulphates and mixtures thereof.

When the liquid phase comprises, as the protic solvent, water, the above-mentioned polymeric material may be referred to as a hydrogel material.

By hydrogel material, we mean that it is a material in the form of a gel consisting of a polymer in which an aqueous phase is retained, which conventionally corresponds to the polymerization medium (i.e. the medium in which the polymerization takes place to form the constituent polymer of the hydrogel material), which has absorbed, in our case, the organophosphorus compounds. Due to the flexibility of the polymer network constituting the hydrogel, such a material is conventionally capable of absorbing a mass of water which may exceed 100 times the mass of the polymer structure and, in our case, at least 5 times the mass of the polymer structure.

By polymer is meant, conventionally, within the meaning of the invention, a compound consisting of the linking of one or more repeating units.

By repeating unit is meant, conventionally, within the meaning of the invention, a divalent organic group (i.e. a group forming a bridge) obtained from a monomer after polymerization of the latter, the formula of the repeating unit corresponding to that of the monomer whose double bond has been replaced by two hydrogen atoms carried by the carbon atoms carrying the double bond in the monomer.

The polymer comprises repeating units resulting from the polymerization of the monomer(s) and of the crosslinking agent(s), which means, in other words, that this polymer is a crosslinked polymer, which may comprise several chains comprising one or more repeating units resulting from the polymerization of the monomer(s) linked together by one or more repeating units (which may thus be qualified as crosslinking units) resulting from the polymerization of the crosslinking agent(s).

By way of example, the polymer may comprise a repeating unit resulting from the polymerization of a monomer of formula (I) as defined above, this repeating unit thus corresponding to the following formula (I'):

$$-\!\!\left(\mathrm{CH_2}-\underset{\underset{\mathrm{COR^1}}{|}}{\overset{\overset{\mathrm{R^2}}{|}}{\mathrm{C}}}\right)\!\!- \qquad (\mathrm{I'})$$

with $R^1$ and $R^2$ being as defined above, and even more specifically, the polymer may comprise a repeating unit resulting from the polymerization of a monomer of formula (II) as defined above, this repeating unit thus corresponding to the following formula (II'):

$$-\!\!\left(\mathrm{CH_2}-\underset{\underset{\underset{R^4\diagup\underset{\mathrm{R^5}}{\mathrm{N}}}{|}}{\overset{\overset{\mathrm{R^2}}{|}}{\mathrm{C}}}}{\overset{|}{\mathrm{C}}}\right)\!\!- \qquad (\mathrm{II'})$$

in which $R^2$, $R^4$ and $R^5$ are as defined above, and more particularly, $R^2$ is a hydrogen atom and $R^4$ and $R^5$ represent a methyl group, in which case the repeating unit corresponds to the following formula (II''):

$$-\!\!\left(\underset{\underset{\mathrm{H}}{|}}{\overset{\overset{\mathrm{H}}{|}}{\mathrm{C}}}-\underset{\underset{\underset{\mathrm{H_3C}\diagup\underset{\mathrm{CH_3}}{\mathrm{N}}}{|}}{\overset{\overset{\mathrm{H}}{|}}{\mathrm{C}}}}{\overset{|}{\mathrm{C}}=\mathrm{O}}\right)\!\!- \qquad (\mathrm{II''})$$

this repeating unit being obtained from the polymerization of the N,N'-dimethylacrylamide monomer.

By way of example, the polymer may also comprise a repeating unit resulting from the polymerization of a crosslinking agent of formula (III) as defined above, this repeating unit thus corresponding to the following formula (III'):

$$-\!\!\left(\mathrm{CH_2}-\underset{\underset{\mathrm{R^6}}{|}}{\overset{\overset{\mathrm{H}}{|}}{\mathrm{C}}}-\overset{\overset{\mathrm{O}}{\|}}{\mathrm{C}}-\mathrm{O}-\!\!\left(\mathrm{CH_2}-\mathrm{CH_2}-\mathrm{O}\right)_{\!n}\!\!-\overset{\overset{\mathrm{O}}{\|}}{\mathrm{C}}-\underset{\underset{\mathrm{R^7}}{|}}{\overset{\overset{\mathrm{H}}{|}}{\mathrm{C}}}-\mathrm{CH_2}\right)\!\!- \qquad (\mathrm{III'})$$

in which $R^6$, $R^7$ and n are as defined above and, more particularly, $R^6$ and $R^7$ are methyl groups.

In particular, a polymer capable of entering advantageously in the constitution of the invention is a crosslinked polymer comprising several chains comprising a repeating unit of formula (II) as defined above (or more specifically a repeating unit of formula (II') or (II''), said chains being linked together by a repeating unit of formula (III'), which repeating unit thus constitutes a crosslinking unit.

From a structural point of view, the hydrogel material is advantageously in the form of a membrane, for example, a flat membrane having a thickness which may range from 1 mm to 2 cm, the membrane being able to fulfill a patch function.

As mentioned above, the solutions and the polymeric materials of the invention are, by virtue of their ingredients, capable of sequestering or trapping organophosphorus compounds.

The invention also relates to:
- the use of a solution or of a polymeric material according to the invention for trapping at least one toxic chemical agent, such as an organophosphorus compound; and
- a process for trapping a chemical toxic agent, such as an organophosphorus compound, present on a surface contaminated by said chemical toxic agent, said chemical toxic agent being, for example, an organophosphorus compound.

More specifically, this process comprises the following steps:
- a step of bringing the solution according to the invention into contact with the contaminated surface;
- a step of forming a polymeric material as defined above by polymerization of the monomer(s) and of the crosslinking agent(s) present in the solution;
- a step of removing the polymeric material thus formed from said surface, by means of which said surface is thus depleted or even devoid of said chemical toxic agent.

The contacting step may be carried out by coating the surface to be decontaminated with the solution or by spraying the solution on the surface to be decontaminated.

The step of forming the polymeric material may be performed by applying radiation to initiate the photopolymerization through the action of the photopolymerization initiators.

This radiation may advantageously belong to the field of ultraviolet radiation, i.e. radiation exhibiting at least one wavelength of the ultraviolet range, i.e. a wavelength of between 350 nm and 420 nm.

The radiation intensity may be between 1000 and 10,000 $W/m^2$.

The origin of the radiation may be natural (for example, exposure to natural sunlight) or artificial, such as, for example, radiation from a UV lamp. By way of example, an artificial light source which may be used in the context of the invention may be a UV lamp emitting a wavelength of 405 nm with a power of 9000 $W/m^2$.

The invention will now be described in light of the examples below, these examples being provided only by way of illustration of the invention and in no way constituting a limitation thereof.

DETAILED PRESENTATION OF PARTICULAR EMBODIMENTS

Example 1

This example illustrates the preparation of a solution according to the invention.

11.0 mL of distilled water and 1.1 g of Cabot® brand fumed silica (reference CAB-O-SIL® M 5) are introduced into an opaque 30 mL pill container, wherein the average particle diameter lies between 0.2 and 0.3 μm and the specific surface is 200 $m^2/g$. The whole is homogenized by stirring in a Speedmixer type apparatus at 2000 rpm for 45 seconds.

10.4 mL of N,N'-dimethylacrylamide, 0.35 mL of poly(ethyleneglycol)dimethacrylate with an average molar mass of 750 g/mol, 0.25 g of IRGACURE® 184, and 0.25 g of potassium fluoride are then added to the solution. The whole is mixed by magnetic stirring for 45 minutes.

The solution obtained at the end of this example comprises a thixotropic filler (silica) in an amount of 4.8% of the total mass of the solution, and potassium fluoride in an amount of 1.09% of the total mass of the solution.

Example 2

In this example, the procedure is similar to that described in Example 1, except that the amount of fumed silica introduced is 0.92 g instead of 1.1 g.

The solution obtained at the end of this example comprises a thixotropic filler (silica) in an amount of 4.0% of the total mass of the solution, and potassium fluoride in an amount of 1.1% of the total mass of the solution.

Example 3

In this example, the procedure is similar to that described in Example 1, except that the fumed silica is replaced by a thixotropic mixture consisting of 0.7 g of fumed silica as defined in Example 1 and 1.1 g of polyvinyl alcohol (PVA).

The solution obtained at the end of this example comprises a thixotropic filler (silica+PVA) in an amount of 7.6% of the total mass of the solution, and potassium fluoride in an amount of 1.05% of the total mass of the solution.

Example 4

In this example, the procedure is similar to that described in Example 1, except that no thixotropic filler was added.

The solution obtained at the end of this example contains potassium fluoride in an amount of 1.14% of the total mass of the solution.

Example 5

In this example, the solutions prepared in the previous examples are tested to determine:
- the gel uptake;
- the creep; and
- the decontaminating effectiveness.

a) Evaluation of Gel Uptake

The above-mentioned solutions were polymerized by artificial insolation in a UV oven fitted with LED bulbs with a wavelength of 405 nm and a power of 9000 Watts/$m^2$, and by indirect natural insolation (simple deposition of the solution of the invention in a room with a window). A solution of interest is a solution for which, in the context defined above, the gel setting time is less than 1 minute.

At different time intervals, gel uptake is determined by palpation. The results obtained are presented below:

| | Apparent gel uptake time | |
|---|---|---|
| Solution | Artificial insolation | Natural insolation |
| Example 1 (1.1 g silica) | ≤30 seconds | Between 12 minutes and 1 hour* |
| Example 2 (0.92 g silica) | ≤30 seconds | Between 12 minutes and 1 hour* |

-continued

| Solution | Apparent gel uptake time | |
|---|---|---|
| | Artificial insolation | Natural insolation |
| Example 3 (0.7 g silica + 1.1 g PVA) | ≤1 minute | Not determined |
| Example 4 (0 g silica) | 4 minutes | >1.5 hours |

*variations observed depending on climatic conditions

It has been found that, by an unexpected effect, the incorporation of a thixotropic filler makes it possible to drastically improve the rate of gel setting of the compounds of the invention compared to a similar formulation devoid of said fillers.

b) Creep Evaluation 1 ml of each solution described above was taken and deposited by syringe on a glass plate, itself placed on a metal support inclined at 40°. The displacement of the solution drops was measured over a period of 30 minutes. It should be noted that an effective solution is a solution exhibiting minimal creep, which corresponds to a flow rate of less than 1 mm/minute over a period of 30 minutes.

| Solution | Displacement | Creep speed |
|---|---|---|
| Example 1 (1.1 g silica) | 1 à 2 mm | 0.06 mm/min |
| Example 2 (0.92 g silica) | <1 mm | <0.03 mm/min |
| Example 3 (0.7 g silica + 1.1 g PVA) | 10 mm | 0.33 mm/min |
| Example 4 (0 g silica) | >50 mm | >1.6 mm/min |

Thus, the solutions of the invention exhibit a significantly reduced creep displacement compared to the comparative solution devoid of thixotropic filler (Example 4). However, it should be noted that these results come from a combined effect with the gel setting, which may occur from 12 minutes after the solution has been applied.

c) Evaluation of the Decontaminating Efficiency 10 test samples, plans and dimensions 2.5 cm×2.5 cm, are made by cutting a plate of raw aluminum and an earthenware plate, to give 5 aluminum samples and 5 samples of earthenware. Each sample is rinsed with water and ethanol and then dried.

On each of the samples are deposited 10 µl of methyl methylphosphonate (DMMP) simulant. It is specified that a simulant is a compound having physicochemical properties similar to warfare organophosphorus compounds (for example, in terms of morphology, solubility, boiling temperature) while being little or not harmful with respect to the human organism.

In order to come closer to actual operating conditions, a waiting time of 10 minutes is observed to allow the simulant to penetrate into any porosities of the sample. At the end of this waiting time, a sample of each material is collected and rinsed with 2×0.5 mL of absolute ethanol. A test sample of each of the rinsing solutions is obtained and then it is analyzed by gas chromatography coupled with mass spectrometry GC-MS. The area of the signal corresponding to DMMP on the chromatogram is noted and constitutes the comparative value.

At the same time, on each zone contaminated with DMMP of other samples, are deposited 200 µL of the solution of the invention described in Example 2. Two samples of each material are then immediately placed in a UV oven and then irradiated at 405 nm at a rate of 9000 Watts/m² for one minute, while the 4 remaining samples (2 aluminum samples+2 earthenware samples) are kept as they are in the room (exposure to indirect natural light). One hour after bringing the solution of the invention into contact with the samples, the resulting material, which then takes on the appearance of a flexible membrane for the 8 samples, is removed by manual peeling using pliers.

Each support is rinsed with 2×0.5 mL of absolute ethanol. A test sample of each rinsing solution is taken. These are analyzed by GC-MS, then the area of each signal corresponding to DMMP is divided by the comparative value previously obtained for each respective material in order to calculate the percentage of residual DMMP. For each material, an average value per exposure mode is calculated for each pair of samples.

During these tests, no trace of DMMP was detected on all of the supports treated with the compound of the invention, which means that the amount of DMMP is below the detection threshold of the device.

No visual degradation is visible on the samples. The measurements performed are summarized below:

| Solution: | % of residual DMMP after 1 h of contact | |
|---|---|---|
| Example 2 (0.92 g silica) | Artificial insolation (1 min at 405 nm/9000 W/m²) | Natural insolation (1 h, indirect exposure) |
| On aluminum | <0.1% | <0.1% |
| On earthenware | <0.1% | <0.1% |

** Detection limit of the GCMS device estimated at 1000 ppm for the measurement method used.

For all of the cases studied, the treatment of contaminated surfaces with the invention makes it possible to reduce the levels of residual contaminants (DMMP) to particularly low values (less than 0.1%). This means that one liter of the solution of the invention is able to remove approximately 50 mL of organophosphate from a contaminated surface, demonstrating the high level of efficiency of the compound of the invention.

What is claimed is:

1. A solution which may be used for the trapping of at least one toxic chemical agent, said solution comprising:
   at least one protic solvent,
   at least one monomer comprising an (alkyl)acrylic group, an (alkyl)acrylate group or an (alkyl)acrylamide group,
   at least one crosslinking agent comprising at least two groups selected from the group consisting of (alkyl)acrylic, (alkyl)acrylate and (alkyl)acrylamide groups,
   at least one photopolymerization initiator,
   at least one thixotropic filler,
   and at least one agent selected from the group consisting of alkali halides, alkali phosphates, alkali sulfates and mixtures thereof,
   wherein the at least one thixotropic filler is selected from the group consisting of an organic filler, an inorganic filler and a mixture thereof, the organic filler being selected from the group consisting of a polyvinylalcohol and copolymers based on acrylate and/or methacrylate units and the inorganic filler being selected from the group consisting of colloidal silica, fumed silica and mixtures thereof.

2. The solution according to claim 1, wherein the protic solvent is water.

3. The solution according to claim 1, wherein the protic solvent is present in an amount of 40 to 60% by volume relative to the total volume of the solution.

4. The solution according to claim 1, wherein the at least one monomer comprising an (alkyl)acrylic group, an (alkyl)acrylate group or an (alkyl)acrylamide group corresponds to the following formula (I):

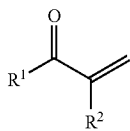

in which:
R$^1$ represents —OR' with R' representing a hydrogen atom or an alkali element; —OR$^3$ with R$^3$ representing an alkyl group; or —NR$^4$R$^5$ with R$^4$ and R$^5$ representing, independently of each other, a hydrogen atom or an alkyl group;
R$^2$ represents a hydrogen atom or an alkyl group.

5. The solution according to claim 1, wherein the at least one monomer is a monomer corresponding to the following formula (II):

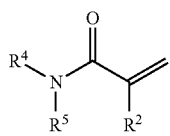

in which:
R$^4$ and R$^5$ representing, independently of each other, a hydrogen atom or an alkyl group;
R$^2$ represents a hydrogen atom or an alkyl group.

6. The solution according to claim 1, wherein the monomer is N,N'-dimethylacrylamide.

7. The solution according to claim 1, wherein the at least one crosslinking agent comprises at least two (alkyl)acrylate groups.

8. The solution according to claim 1, wherein the at least one crosslinking agent corresponds to the following formula (III):

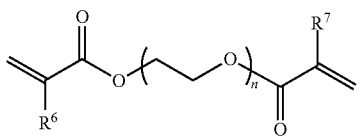

in which:
R$^6$ and R$^7$ represent, independently of each other, a hydrogen atom or an alkyl group;
n corresponds to the unit count in parenthesis, this number ranging from 1 to 15.

9. The solution according to claim 1, wherein the crosslinking agent is polyethylene glycol dimethacrylate.

10. The solution according to claim 1, wherein the at least one crosslinking agent is present in an amount of 1 to 5% by volume relative to the total volume of the solution.

11. The solution according to claim 1, wherein the at least one photopolymerization initiator is an initiator of the aromatic ketone family.

12. The solution according to claim 1, wherein the photopolymerization initiator is 1-hydroxy-cyclohexylphenyl ketone.

13. The solution according to claim 1, wherein the at least one photopolymerization initiator is present in an amount of 1 to 15 g/L.

14. The solution according to claim 1, wherein the thixotropic filler is a mixture of fumed silica and polyvinyl alcohol.

15. The solution according to claim 1, wherein the thixotropic filler is present in an amount of 1 to 10% by mass of the total mass of the solution.

16. The solution according to claim 1, wherein the at least one agent is present in an amount of 1 to 15 g/L.

17. The solution according to claim 1, wherein the agent is potassium fluoride.

18. A polymeric material obtainable by polymerization of a solution as defined according to claim 1, said material comprising a polymer resulting from the polymerization of the monomer(s) and of the crosslinking agent(s), and trapping, therein, a liquid phase comprising at least one thixotropic filler and at least one agent selected from the group consisting of alkali halides, alkali phosphates, alkali sulfates and mixtures thereof.

19. A method of trapping a chemical toxic agent present on a surface contaminated by said chemical toxic agent comprising the following steps:
a step of bringing the solution as defined according to claim 1 into contact with the contaminated surface;
a step of forming a polymeric material by polymerization of the monomer(s) and of the crosslinking agent(s) present in the solution and trapping, therein, a liquid phase comprising the least one thixotropic filler and the at least one agent;
a step of removing the polymeric material thus formed from said surface, by means of which said surface is thus depleted or even devoid of said chemical toxic agent.

20. A method according to claim 19, wherein the chemical toxic agent is an organophosphorus compound.

* * * * *